(12) United States Patent
Mahler et al.

(10) Patent No.: US 9,074,481 B2
(45) Date of Patent: Jul. 7, 2015

(54) TURBOMACHINE COMPONENT

(75) Inventors: Alexander Mahler, Kreuzlingen (CH); Hartmut Haehnle, Kuessaberg (DE)

(73) Assignee: ALSTOM TECHNOLOGY LTD, Baden (CH)

( * ) Notice: Subject to any disclaimer, the term of this patent is extended or adjusted under 35 U.S.C. 154(b) by 659 days.

(21) Appl. No.: 13/400,185

(22) Filed: Feb. 20, 2012

(65) Prior Publication Data

US 2012/0230833 A1 Sep. 13, 2012

(30) Foreign Application Priority Data

Mar. 7, 2011 (CH) .......................................... 377/11

(51) Int. Cl.
| | |
|---|---|
| *F01D 5/14* | (2006.01) |
| *B23K 33/00* | (2006.01) |
| *B23K 31/00* | (2006.01) |
| *B23P 6/00* | (2006.01) |
| *F01D 5/00* | (2006.01) |

(52) U.S. Cl.
CPC ............ *F01D 5/147* (2013.01); *B23K 2201/001* (2013.01); *B23P 6/005* (2013.01); *F01D 5/005* (2013.01); *F05D 2260/941* (2013.01); *B23K 31/003* (2013.01); *B23K 33/00* (2013.01); *F05D 2230/23* (2013.01); *F05D 2230/80* (2013.01)

(58) Field of Classification Search
CPC ..... F01D 5/147; F01D 5/005; F05D 2230/23; B23K 2201/001; B23K 31/003; B23K 33/00; B23P 6/005
USPC ......... 416/97 R, 223 A, 223 R, 229 A, 229 R
See application file for complete search history.

(56) References Cited

U.S. PATENT DOCUMENTS

| | | | |
|---|---|---|---|
| 5,060,842 A | 10/1991 | Qureshi et al. |
| 5,092,942 A | 3/1992 | Fraser et al. |
| 5,269,057 A | 12/1993 | Mendham |
| 5,822,852 A | 10/1998 | Bewlay et al. |

(Continued)

FOREIGN PATENT DOCUMENTS

| | | |
|---|---|---|
| DE | 908686 C | 4/1954 |
| DE | 102006033799 A1 * | 1/2008 |

(Continued)

OTHER PUBLICATIONS

European Patent Ofice, Search Report in Swiss Patent Application No. CH 3772011 (Jun. 21, 2011).

*Primary Examiner* — Edward Look
*Assistant Examiner* — Jason Davis
(74) *Attorney, Agent, or Firm* — Buchanan Ingersoll & Rooney PC

(57) ABSTRACT

A turbomachine component includes a basic component including a first outer wall having a first joint face. An additional part includes a second outer wall having a second joint face, wherein the first and the second wall enclose an internal cavity, and wherein the first and the second joint faces are joined together between the basic component and the additional part. At least one wall-like intermediate piece is disposed in at least one of the basic component and the additional part and extends from the respective outer wall into the internal cavity, the at least one wall-like intermediate piece including a cutout having a transition contour that deviates from a straight line and is disposed at at least one transition between the at least one wall-like intermediate piece and the outer wall so as to relieve at least one of a mechanical and a thermal stress.

19 Claims, 6 Drawing Sheets

(56) References Cited

U.S. PATENT DOCUMENTS

| | | |
|---|---|---|
| 6,394,750 B1 | 5/2002 | Hiskes |
| 6,508,000 B2 | 1/2003 | Burke et al. |
| 6,908,288 B2 | 6/2005 | Jackson et al. |
| 2004/0146401 A1 | 7/2004 | Chlus et al. |
| 2008/0308610 A1 | 12/2008 | Watson et al. |
| 2010/0074755 A1* | 3/2010 | Richter et al. ............ 416/223 R |
| 2011/0047899 A1 | 3/2011 | Numajiri |

FOREIGN PATENT DOCUMENTS

| | | |
|---|---|---|
| DE | 102008025848 A1 | 12/2009 |
| EP | 1143106 A1 | 10/2001 |
| EP | 1441107 A2 | 7/2004 |
| EP | 1914382 A1 | 4/2008 |
| EP | 2002919 A2 | 12/2008 |
| GB | 2254892 A | 10/1992 |

* cited by examiner

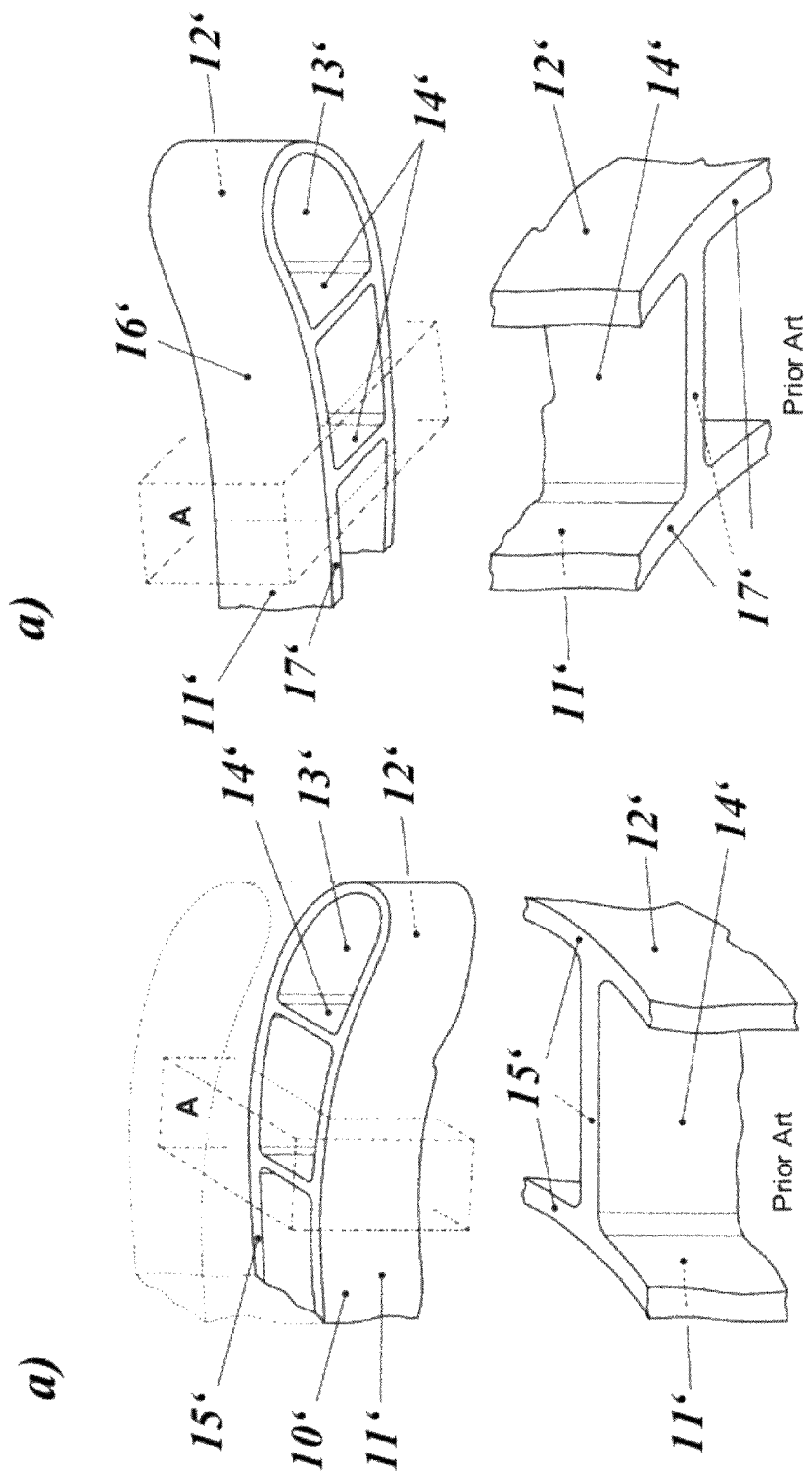

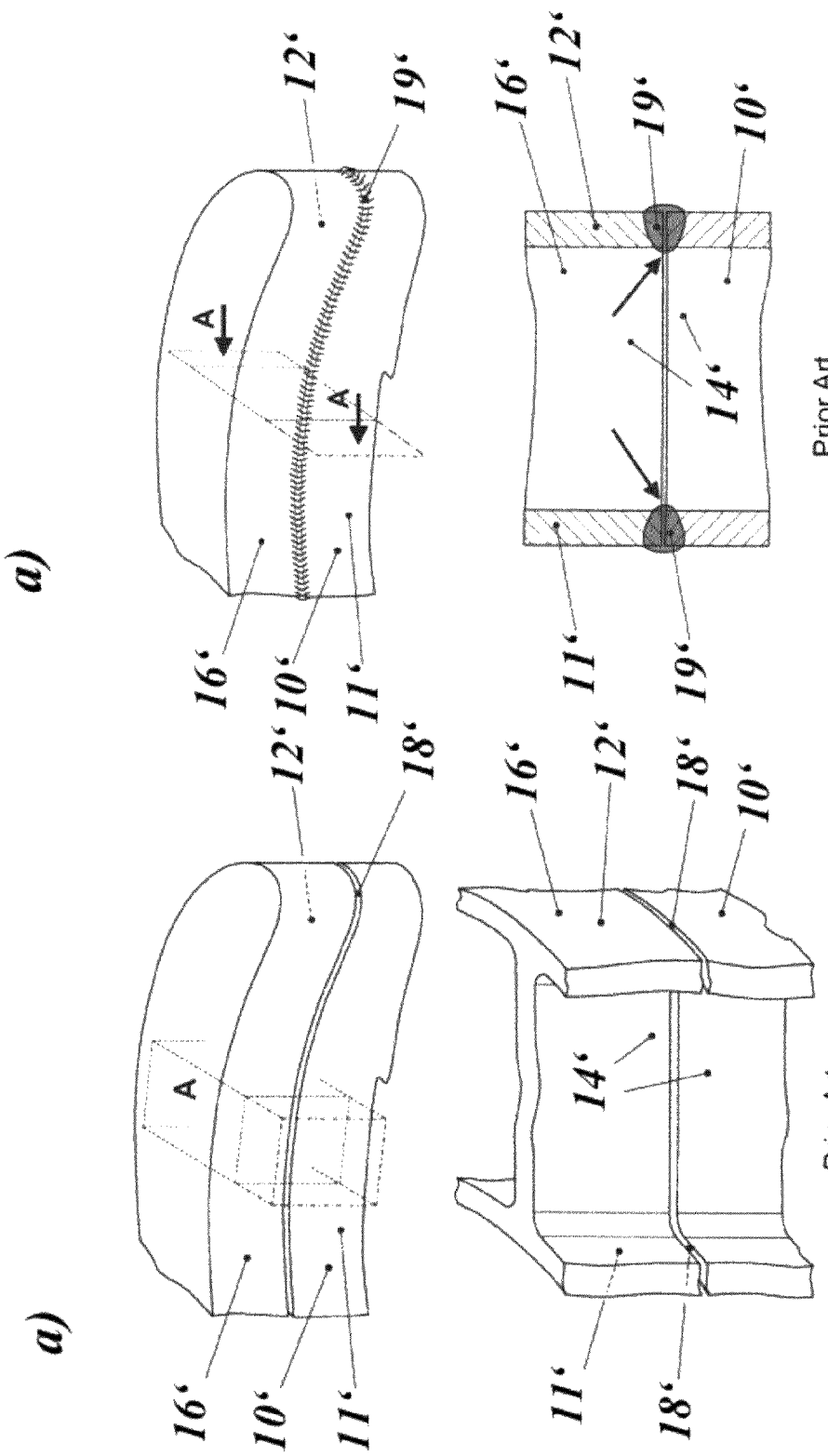

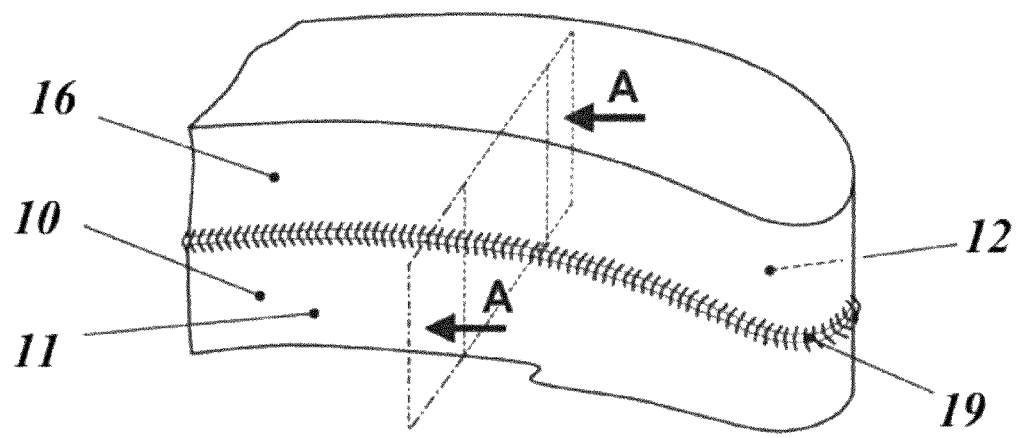
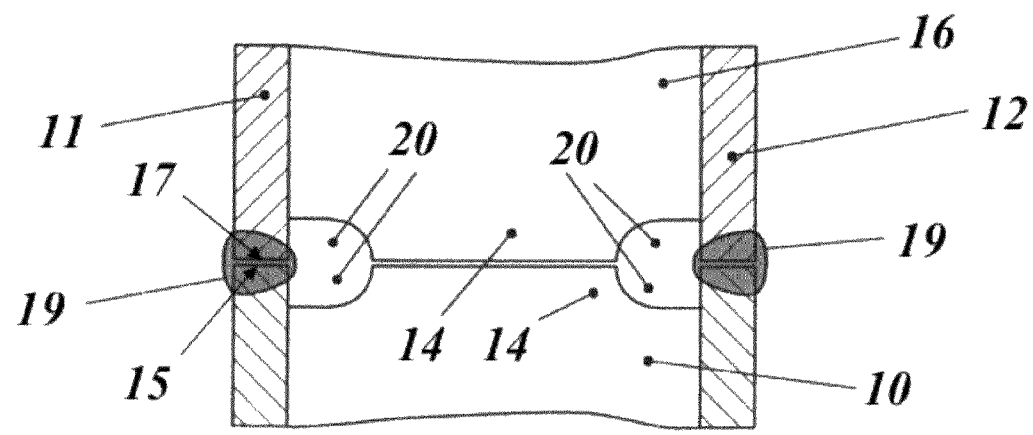
Fig.6

TURBOMACHINE COMPONENT

CROSS-REFERENCE TO PRIOR APPLICATIONS

Priority is claimed to Swiss Patent Application No. CH 00377/11, filed on Mar. 7, 2011, the entire disclosure of which is hereby incorporated by reference herein.

FIELD

The present invention relates to the field of turbomachines.

BACKGROUND OF THE INVENTION

In the case of a turbomachine component, for example a turbine blade, some of the material (e.g. by means of machining) can be removed and replaced by an insert. Such a procedure is principally used for the repair and reconditioning of such construction elements, but can also be used just as well for purposes which lie outside a repair.

For such repairs, solution proposals have been put forward for the most diverse component types, base materials and joining processes (e.g. hard soldering, automatic welding, welding or a combination of soldering and welding). Representatively for many other printed publications, reference may be made to printed publications U.S. Pat. No. 5,822,852, EP 1 143 106, U.S. Pat. Nos. 6,508,000, 5,060,842 and U.S. Pat. No. 5,092,942 in this context.

Such an insert for a turbomachine component can have the same or a different geometry as the component itself, and it can consist of the same or a different material as the component itself. The joining process in this case depends upon the material of the component and of the insert (for this, see U.S. Pat. No. 6,908,288 or U.S. Pat. No. 5,269,057).

SUMMARY OF THE INVENTION

In an embodiment, the present invention provides a turbomachine component including a basic component having a first outer wall having a first joint face. An additional part includes a second outer wall having a second joint face, wherein the first and the second wall enclose an internal cavity, and wherein the first and the second joint faces butt against each other and are joined together in a materially bonding manner so as to form a joint region between the basic component and the additional part. At least one wall-like intermediate piece is disposed in at least one of the basic component and the additional part and extends from the respective outer wall into the internal cavity, the at least one wall-like intermediate piece including a cutout having a transition contour that deviates from a straight line and is disposed at at least one transition between the at least one wall-like intermediate piece and the outer wall so as to relieve at least one of a mechanical and a thermal stress.

BRIEF DESCRIPTION OF THE FIGURES

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 1-4 show in each case, in a plurality of sub-figures (a) and (b), an example of a turbomachine component in the form of a turbine blade, which is created by joining a basic component and an additional part;

FIGS. 5, 6 show in each case, in a plurality of sub-figures (a) and (b), a turbomachine component comparable to FIGS. 1-4, which is formed according to an exemplary embodiment of the invention and is created by joining a basic component and an additional part;

DETAILED DESCRIPTION

Figure 5:
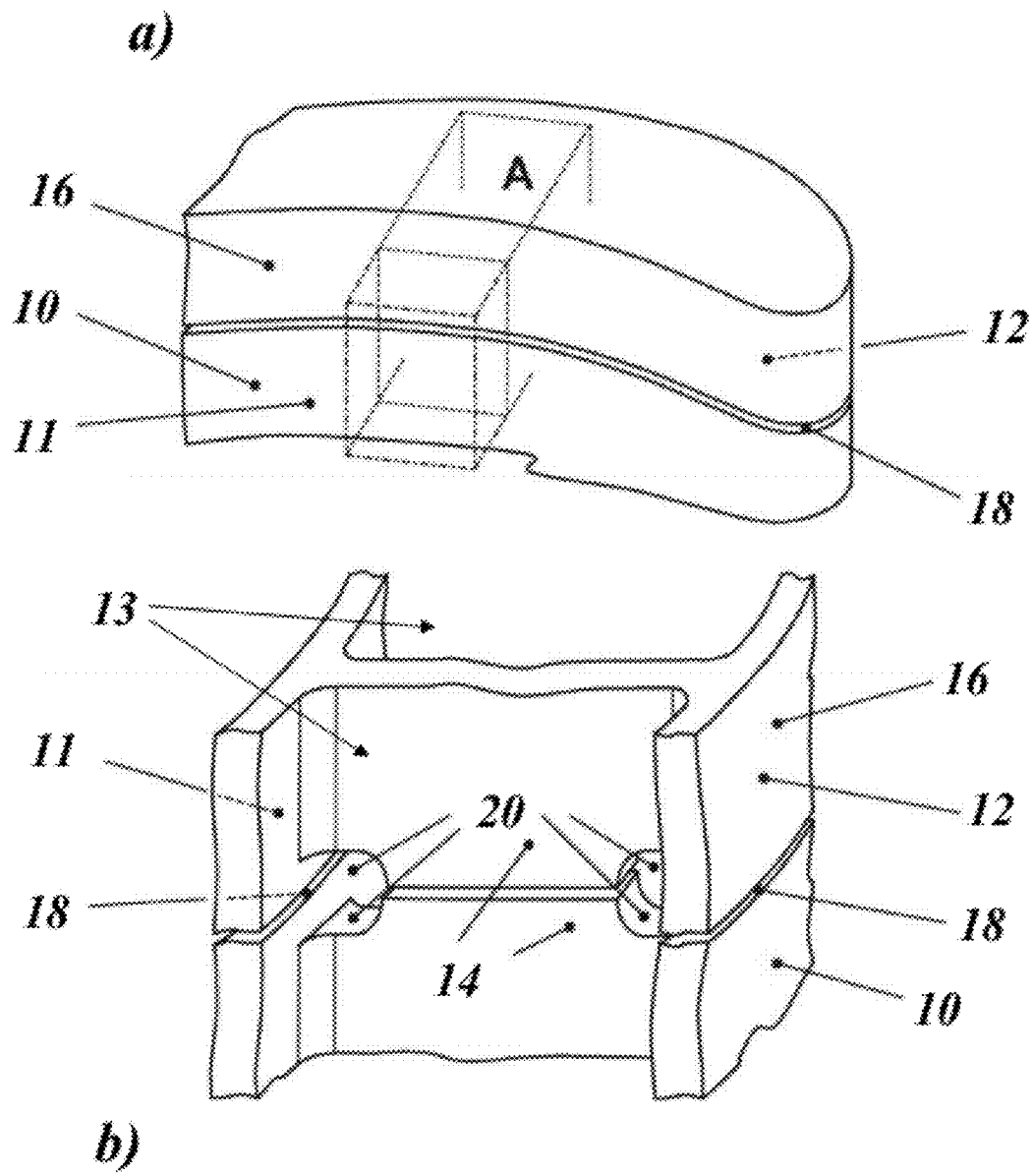

In an embodiment of the invention, the crack-like sources of mechanical and/or thermal stress increases, which are described above, can be reduced or completely eliminated in their effect in the transition region between the outer walls and the inner walls or intermediate pieces in order to increase the mechanical and/or thermal loadability and the anticipated service life of the component.

In an embodiment of the invention, the fluidic disadvantages of the sections inside the component which are not joined in a materially bonding manner can be reduced or completely eliminated in order to improve the internal cooling of the component.

In an embodiment of the invention, a turbomachine component comprising a basic component and an additional component, which by an outer wall in each case enclose an internal cavity, butt against each other in a joint region in the region of the outer wall by matched joint faces and are joined together in a materially bonding manner in the joint faces, wherein in the basic component and/or in the additional part provision is made for at least one wall-like intermediate piece which, starting from the outer wall, extends into the internal cavity. The invention is distinguished by the fact that a cutout, with a transition contour which deviates from a straight line, is arranged at at least one transition between the intermediate piece and the outer wall for relieving mechanical and/or thermal stresses there. The intermediate piece in this case can be a rib, a connecting web, an intermediate wall or the like. The transition contour in this case can assume various shapes.

In one development of the invention, a wall-like intermediate piece is provided in each case in the basic component and in the additional part, wherein the wall-like intermediate pieces of both parts are in alignment with each other and butt against each other in the joint region.

By the same token, it is also conceivable that the wall-like intermediate pieces of both parts are not in alignment with each other and only partially butt against each other, or do not butt against each other at all, in the joint region.

Furthermore, it is possible that a wall-like intermediate piece is provided only in the basic component or only in the additional component so that there is no opposite intermediate piece in the joint region.

In an embodiment, the basic component and the additional component can advantageously at least partially be joined together in a materially bonding manner in the region of the intermediate pieces. It is also conceivable that they are not at all joined together in a materially bonding manner, or are fully joined together in a materially bonding manner.

In another development of the invention, the wall-like intermediate piece(s) extends, or extend, through the internal cavity between two opposite sections of the outer wall so that they mutually support the outer walls and correspondingly transfer forces between said outer walls.

By the same token, it is conceivable that the wall-like intermediate piece(s), starting from the outer wall, extends, or extend, into the internal cavity without reaching another section of the outer wall in the process.

According to another development of the invention, the additional part is provided as a replacement for material removed from the basic component. This is particularly the case when the additional part, for repairing the basic component, is inserted as a replacement into a recess which is machined out in said basic component.

It is also conceivable, however, that the additional part is provided for widening the basic component.

In an embodiment, the basic component and the additional part can basically consist of different materials if this is expedient. However, the basic component and the additional part preferably consist of the same material.

According to another development of the invention, the basic component and the additional part are joined together in a materially bonding manner by means of a suitable joining process. In this case, the joining process is optional. Welding and/or hard soldering and/or adhesive fastening can preferably be used.

The invention can be used especially advantageously if the component is a turbine blade.

In another development of the invention, the stress-relieving transition contour is formed in a recessed manner in relation to the joint faces of the basic component or of the additional part. As a result of this, a mechanical decoupling between the outer walls and the intermediate piece in the joint region is achieved, as a result of which mechanical and/or thermal stresses in this region are significantly reduced.

In an embodiment, the stress-relieving transition contour is preferably formed in a set-back manner on the inner side of the outer wall.

In an embodiment, the detailed profile of the transition contour in this case can be variably designed.

Thus, it can be advantageous if at a predetermined distance the stress-relieving transition contour returns to the level of the joint faces.

In particular, the stress-relieving transition contour returns to the level of the joint faces in an arc, especially in the form of a quarter circle.

Alternatively to this, the stress-relieving transition contour can also return to the level of the joint faces in a linear gradient.

By the same token, it is conceivable that the stress-relieving transition contour returns to the level of the joint faces in a step-like manner.

In other cases, the stress-relieving transition contour can remain at a level which is lowered in relation to the joint faces.

In this context, it is conceivable that in the stress-relieving transition contour the transition to the lowered level is carried out in a step-like manner.

In an embodiment, the transition in the stress-relieving transition contour to the lowered level can also be carried out in an arc.

Furthermore, the transition of the stress-relieving transition contour to the lowered level can be carried out in a linear manner.

Depending upon requirement, such a transition contour can be provided on a transition, or on a plurality of transitions, between the intermediate piece and the outer wall.

If the basic component and the additional part have an intermediate piece in each case and the intermediate pieces of both parts butt against each other with a butt joint in the joint region without the gap formed between both intermediate pieces being completely closed by means of a materially bonding joint, and if a medium, for example cooling air, flows inside the cavity along the intermediate pieces, undesirable flow vortices can develop in the joint region. In order to reduce these flow vortices, it can be advantageous, according to another development of the invention, if, for reducing flow turbulences which occur there, the butt joint has a cross-sectional contour which deviates from a straight line which is oriented perpendicularly to the intermediate piece.

Such a deviation can be that the butt joint has a linear cross-sectional contour which lies obliquely to the intermediate piece. Such a cross-sectional contour is advantageous when the flow direction is opposite on both sides of the butt joint.

It is also conceivable, however, that the butt joint has a V-shaped cross-sectional contour, or that the butt joint has an arc-shaped cross-sectional contour. Such a cross-sectional contour is advantageous when the flow direction is the same on both sides of the butt joint.

According to the invention, the crack-like mechanical and/or thermal stress sources at the transition between the joint region of the outer walls and the joint region of the intermediate pieces can be reduced or eliminated in their effectiveness by the geometry in this transition region being changed by means of a cutout with a transition contour which deviates from a straight line.

Such a cutout is also advantageous when a wall-like intermediate piece is only provided either in the basic component or in the additional part.

An example of such a turbomachine component, which relates specifically to a turbine blade or its blade airfoil, is reproduced in detail in FIGS. 1-4. The basic component 10' (in this case a blade airfoil of a turbine blade), which is shown in FIGS. 1-4, has an encompassing outer wall which encloses an internal cavity 13'. The outer wall is divided into a pressure-side outer wall 11' and a suction-side outer wall 12' (FIG. 1a) which merge into each other on the edges of the blade airfoil. Between the two outer walls 11' and 12', a wall-like intermediate piece, or a plurality of wall-like intermediate pieces 14', which can be formed as ribs or can divide the internal cavity 13' into a plurality of chambers, extend through said internal cavity 13'. On the upper side, the basic component 10' has a joint face 15' (FIG. 1b) which extends over the outer walls 11' and 12' and the intermediate pieces 14' and, for example, has been produced as a result of removal of blade material by machining.

A correspondingly formed additional part 16', according to FIG. 2, is to be seated upon the thus prepared basic component 10' as replacement for the removed material or for widening the basic component 10' and is to be joined to the basic component 10' by means of a joining process. For this, a joint face 17', which corresponds to the joint face 15' on the basic component 10', is also formed on the underside of the additional part 16'. According to FIGS. 3a,b, the additional part 16' is seated upon the basic component 10', wherein by their joint faces 15' or 17' both parts butt against each other in a joint region 18' and form a butt joint. Finally, according to FIGS. 4a,b, both parts, by means of a suitable joining process—by means of welding in the present example—are joined together in a materially bonding manner in the joint region 18', wherein a weld seam is produced as a joint seam 19'.

Whereas the outer walls 11' and 12' of the basic component 10' and of the additional part 16' are generally accessible for the joining process, joining for the intermediate pieces 14' becomes significantly more difficult if, for example, a welding process is used. If the intermediate pieces 14' are not joined over their entire joint region or are not joined at all in a materially bonding manner, the non-joined sections in the transition regions between the intermediate pieces and the outer walls, which are marked by arrows in FIG. 4b, act as sources for a mechanical and/or thermal stress increase, as is similarly created as a result of internal cracks, and the loadability and the anticipated service life of the joined component are reduced.

If, furthermore, inside the cavity 13' of the turbomachine component a medium (e.g. for cooling purposes) flows transversely to the joint region between the intermediate pieces 14', flow vortices (turbulences) (see 21 in FIG. 10b), which can locally reduce the cooling effect, can occur in the region of sections in which the intermediate pieces 14' are not joined in a materially bonding manner.

Shown in FIGS. 5 and 6, analogous to FIGS. 3 and 4, is a corresponding exemplary embodiment of the invention in which a turbomachine component is created by a materially bonding joint between a basic component 10 and an additional part 16. The two parts 10 and 16 have in each case a pressure-side outer wall 11 and a suction-side outer wall 12 and on associated joint faces 15 and 17 are joined together in a materially bonding manner in a joint region 18. The joint is effected, for example, by means of a joint seam 19. Inside the cavity 13, the two parts 10 and 16 again have wall-like intermediate pieces 14 which butt against each other by corresponding joint faces. For eliminating mechanical and/or thermal stresses, in this exemplary embodiment provision is then made at the transitions between the intermediate piece 14 and the outer wall 11 or 12 for transition contours 20 (FIGS. 5b and 6b) which are created by cutouts in the form of elongated hole sections, that is to say consist of a straight section and a quarter circle.

Such transition contours 20 can be used for reducing stress if the intermediate pieces 14 are fully or partially joined together in a materially bonding manner in the joint region 18. They can also be used, however, if the intermediate pieces 14 are not joined together, as is shown in FIG. 6b.

Such transition contours 20, depending upon requirement, can be used in the basic component 10 and/or additional part 16 on the one and/or on the other outer wall. The transition contours can have a curved, linear or polygonal shape, or can have a combination of curved, linear and/or polygonal shapes.

Different examples of such a transition contour are reproduced in FIGS. 7a-f. In general, the transition contours of these exemplary embodiments are of a recessed design in relation to the joint faces 15, 17 of the basic component 10 or of the additional part 16. In particular, the transition contours can be of a set-back design (transition contours 20a,b,c and d in FIGS. 7a-d) on the inner side of the outer wall 11, 12. In this case, transition contours, at a predetermined distance from the outer wall 11, 12, can return to the level of the joint faces 15, 17 (transition contours 20a-c in FIGS. 7a-c). This return can be carried out in a curved manner in an arc, especially in the form of a quarter circle (transition contour 20a in FIG. 7a). The transition contours, however, can also return to the level of the joint faces 15, 17 polygonally in a linear gradient or in a step-like manner (transition contour 20b,c in FIGS. 7b,c).

Figure 7:
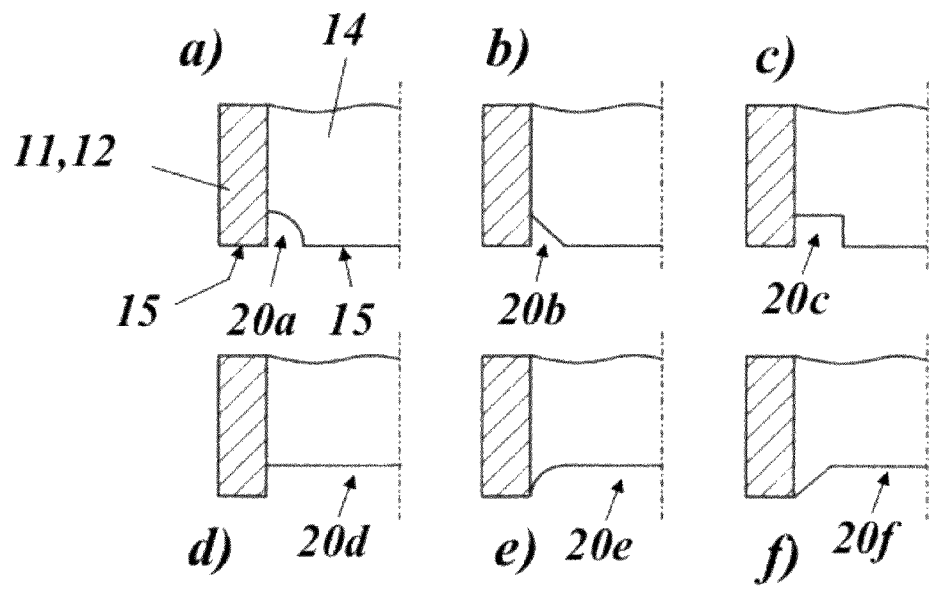
FIG. 7 shows in cross section different exemplary embodiments of a transition contour according to the invention between the outer wall and the intermediate piece.

Furthermore, it is conceivable that the stress-relieving transition contour remains at a lowered level in relation to the joint faces 15, 17 (transition contour 20d-f in FIGS. 7d-f), wherein the transition to the lowered level can be carried out in a step-like manner (polygonally) (transition contour 20d in FIG. 7d) or in a curved manner in an arc (transition contour 20e in FIG. 7e), or in a linear manner (transition contour 20f in FIG. 7f).

Figure 8:
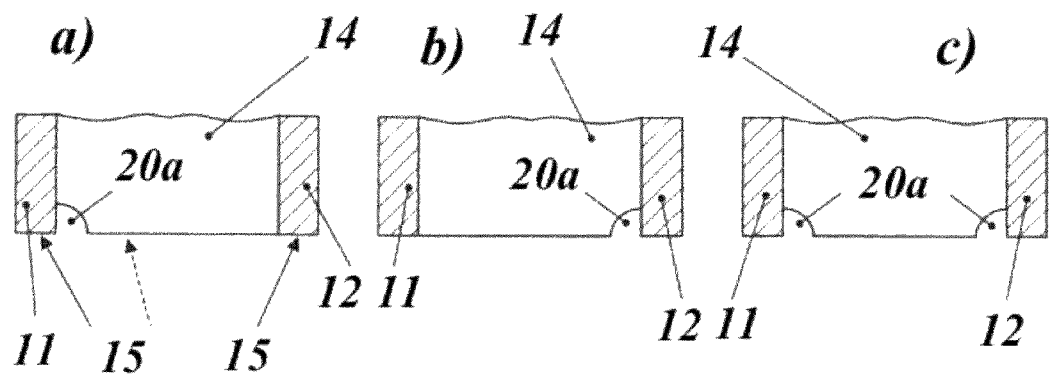
FIG. 8 shows in cross section different exemplary embodiments of an arrangement of transition contours according to the invention between the outer wall and the intermediate piece on the additional part.
Figure 9:
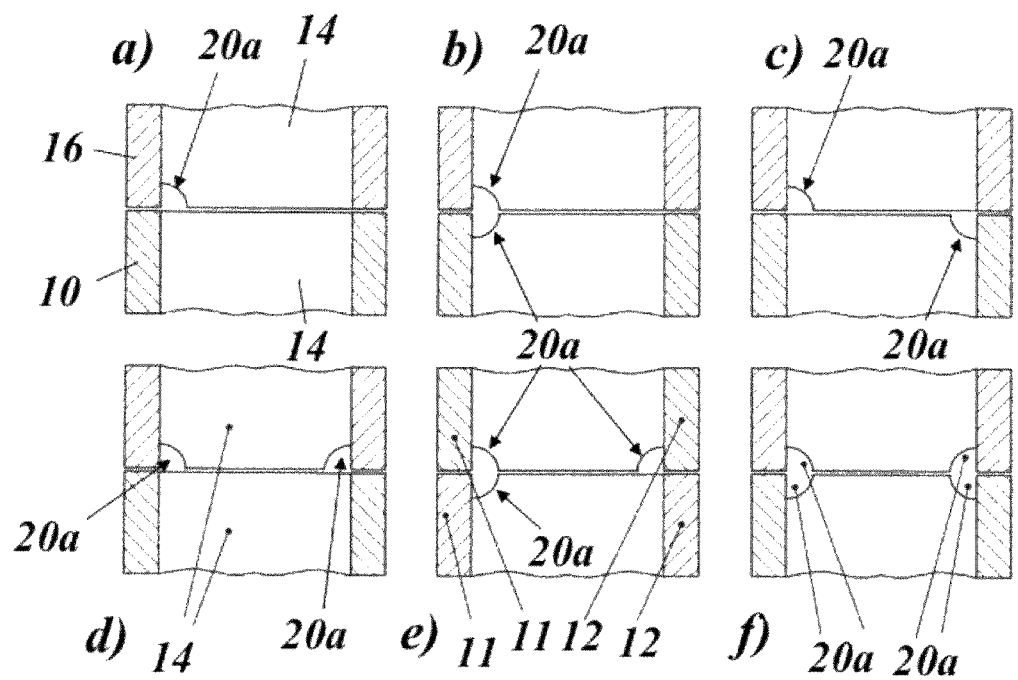
FIG. 9 shows in cross section different exemplary embodiments of a combined arrangement of transition contours according to the invention between the outer wall and the intermediate piece on the basic component and the additional part.

As shown in FIG. 8 and FIG. 9, a transition contour, or a plurality of transition contours 20a (quarter circle-like in this example), can be in a distributed arrangement in the turbomachine component at the same time. According to a general rule, crack-like stress sources can be completely eliminated in each case by means of two opposite transition contours (20a in FIGS. 9b or f), wherein the example from FIG. 9f is equivalent to that shown in FIG. 6 and the invention applies both on the suction side and on the pressure side.

Even if a transition contour 20a is selectively provided only on the basic component 10 or additional part 16, as in the examples (a), (c), (d) and (e) from FIG. 9, a considerable reduction in the mechanical and/or thermal stress can be achieved.

Furthermore, such transition contours improve the joining process of the parts 10 and 16 overall.

Figure 10:
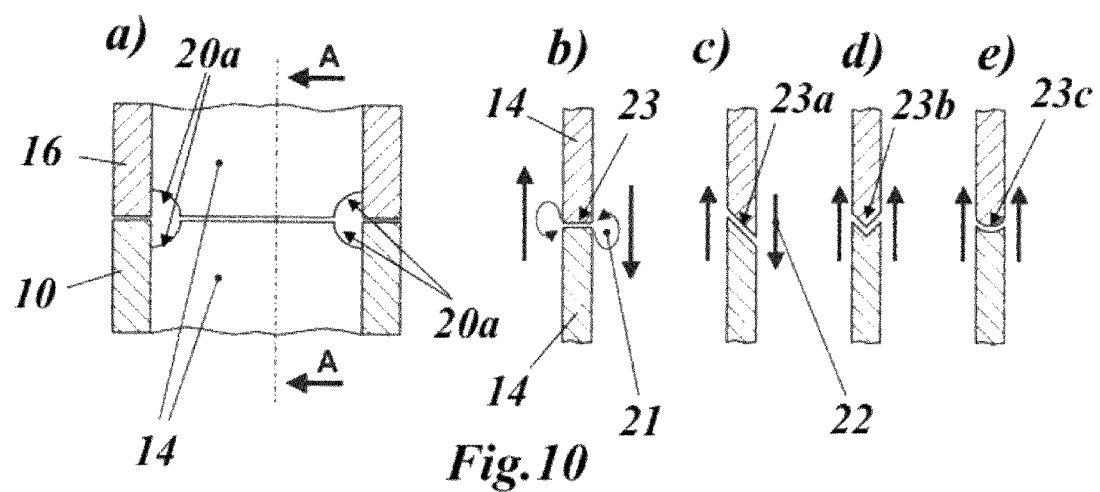
FIG. 10 shows in cross section, in different sub-figures, the vortex development in a configuration according to FIG. 9*f* (FIGS. 10*a,b*) and also exemplary embodiments for cross-sectional contours for reducing the vortex development (FIGS. 10*c-e*).

If a configuration according to FIG. 5 or 6, which is shown once again in FIG. 10a, is taken as a basis, undesirable flow vortices 21 can arise on the edges of intermediate pieces 14 which are not joined together, or not fully joined together, in a materially bonding manner if a medium (e.g. cooling air) flows through the internal cavity 13 of the turbomachine component. The development of such flow vortices 21 can be influenced by a corresponding design (in the cross-sectional contour) of the butt joint 23 between the intermediate pieces 14.

If, according to FIG. 10c, the flow direction 22 is opposite on both sides of the intermediate pieces 14, a butt joint 23a, which has a linear cross-sectional contour lying obliquely to the intermediate piece 14, is advantageous.

If, according to FIGS. 10d and e, the flow directions are of the same orientation on both sides of the intermediate pieces 14, it is advantageous if the butt joint 23b has a V-shaped (polygonal) cross-sectional contour, or if the butt joint 23c has an arc-shaped (curved) cross-sectional contour. Naturally, combined polygonal and curved cross-sectional contours are also possible.

In general, the present invention is applicable to all turbomachine components with an internal cavity and wall-like intermediate pieces, such as turbine blades, compressor blades, heat accumulation segments, combustion chamber components and supporting and casing components.

In an embodiment, the overall result is a turbomachine component which is distinguished by the following characteristics and advantages:

The invention can be applied to turbomachine components in which removed material is to be replaced or new material is to be added. This especially applies to repair, reconditioning, design change, retrofit, upgrade, new design, reverse engineering or to a combination of these processes;

The basic component and the additional part in this case can have similar or different geometries;

The material of the basic component and of the additional part can be the same or different;

The additional part can be produced in any manner, e.g. can be produced from solid material by machining or casting, sintered or produced by means of generative methods ("rapid manufacturing");

The basic component and the additional part can be joined together by means of any joining process, especially by welding (preferably automatic welding) or soldering (preferably hard soldering) or adhesive fastening, or a combination thereof;

The invention can be applied to a turbomachine component or to an insert with an internal wall, rib or strut, or with a plurality of internal walls, ribs or struts;

The invention can be applied to all cases in which only the outer walls, but also the outer walls and the internal walls, ribs or struts are fully or partially joined together in a materially bonding manner;

As a stress-relieving measure, a special transition contour is used at the transition between the joint region of the outer walls and the internal walls, ribs or struts;

As a result of the stress-relieving transition contour, the loadability and service life at the points in question and for the turbomachine component are increased overall;

The stress-relieving transition contour additionally makes the joining process easier;

The stress-relieving transition contour is created by means of a cutout in the internal wall, rib or strut of the basic component and/or of the additional part, which cutout can be curved, linear, polygonal or a combination of curved, linear and/or polygonal;

The transition contour can be locally limited, or can fully extend between opposite sections of the outer walls;

The cutouts or transition contours can be provided at one point or at a plurality of points;

In addition, by special selection of the cross-sectional contour of the joint region between the internal walls, ribs or struts, the development of flow vortices can be favorably influenced;

The cross-sectional contour of the joint region between the internal walls, ribs or struts can be curved, linear, polygonal or a combination of curved, linear and/or polygonal.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF DESIGNATIONS 10, 10' Basic component (e.g. turbine blade)
11, 11' Outer wall (e.g. pressure side)
12, 12' Outer wall (e.g. suction side)
13, 13' Internal cavity
14, 14' Intermediate piece (e.g. inner wall or rib)
15, 15' Joint face
16, 16' Additional part
17, 17' Joint face
18, 18' Joint region
19, 19' Joint seam (e.g. weld seam)
20 Transition contour
20a-f Transition contour
21 Flow vortices
22 Flow direction
23 Butt joint
23a-c Butt joint

What is claimed is:

1. A turbomachine component, comprising:
a basic component including a first outer wall having a first joint face;
an additional part including a second outer wall having a second joint face, wherein the first and the second wall enclose an internal cavity, and wherein the first and the second joint faces butt against each other and are joined together in a materially bonding manner so as to form a joint region between the basic component and the additional part;
at least one wall-like intermediate piece disposed in at least one of the basic component and the additional part and extending from the respective outer wall into the internal cavity, the at least one wall-like intermediate piece including a cutout having a transition contour that deviates from a straight line and is disposed at at least one transition between the at least one wall-like intermediate piece and the outer wall so as to relieve at least one of a mechanical and a thermal stress;
wherein the transition contour is recessed relative to the respective first or second joint face, is set-back from an inner side of the respective outer wall, and wherein at a predetermined distance from the outer wall, the transition contour returns to a level of the joint face.

2. The turbomachine component as recited in claim 1, wherein the at least one wall-like intermediate piece includes a first intermediate piece disposed in the basic component and a second intermediate piece disposed in the additional part, and wherein the first intermediate piece and the second intermediate piece are aligned with each other and butt against each other at the joint region.

3. The turbomachine component as recited in claim 2, wherein the basic component and the additional part are joined together in a materially bonding manner at a region of the intermediate pieces.

4. The turbomachine component as recited in claim 1, wherein the at least one wall-like intermediate piece extends through the internal cavity between two opposite sections of the respective outer walls.

5. The turbomachine component as recited in claim 1, wherein the additional part is configured as a replacement for material removed from the basic component.

6. The turbomachine component as recited in claim 1, wherein the additional part is configured to widen the basic component.

7. The turbomachine component as recited in claim 1, wherein the basic component and the additional part include a same material.

8. The turbomachine component as recited in claim 1, wherein the basic component and the additional part are joined using at least one of a weld, a hard soldering and an adhesive fastening.

9. The turbomachine component as recited in claim 1, wherein the turbomachine component is a turbine blade.

10. The turbomachine component as recited in claim 1, wherein the transition contour returns to the level of the joint face in an arc.

11. The turbomachine component as recited in claim 10, wherein the arc includes a quarter circle.

12. The turbomachine component as recited in claim 1, wherein the transition contour returns to the level of the joint face in a linear gradient.

13. The turbomachine component as recited in claim 1, wherein the transition contour returns to the level of the joint face in a step-like manner.

14. A turbomachine component, comprising:
a basic component including a first outer wall having a first joint face;
an additional part including a second outer wall having a second joint face, wherein the first and the second wall enclose an internal cavity, and wherein the first and the second joint faces butt against each other and are joined together in a materially bonding manner so as to form a joint region between the basic component and the additional part;
at least one wall-like intermediate piece disposed in at least one of the basic component and the additional part and extending from the respective outer wall into the internal cavity, the at least one wall-like intermediate piece including a cutout having a transition contour that deviates from a straight line and is disposed at at least one transition between the at least one wall-like intermediate piece and the outer wall so as to relieve at least one of a mechanical and a thermal stress;
wherein the transition contour is recessed relative to the respective first or second joint face, is entirely disposed at a level that is lower than the joint face, and includes an arc-like transition to the lower level.

15. A turbomachine component, comprising:
a basic component including a first outer wall having a first joint face;
an additional part including a second outer wall having a second joint face, wherein the first and the second wall enclose an internal cavity, and wherein the first and the second joint faces butt against each other and are joined together in a materially bonding manner so as to form a joint region between the basic component and the additional part;
at least one wall-like intermediate piece disposed in at least one of the basic component and the additional part and extending from the respective outer wall into the internal cavity, the at least one wall-like intermediate piece including a cutout having a transition contour that deviates from a straight line and is disposed at at least one transition between the at least one wall-like intermediate piece and the outer wall so as to relieve at least one of a mechanical and a thermal stress;
wherein the transition contour is recessed relative to the respective first or second joint face, is entirely disposed at a level that is lower than the joint face, and wherein the transition contour includes a linear transition to the lower level.

16. A turbomachine component, comprising:
a basic component including a first outer wall having a first joint face;
an additional part including a second outer wall having a second joint face, wherein the first and the second wall enclose an internal cavity, and wherein the first and the second joint faces butt against each other and are joined together in a materially bonding manner so as to form a joint region between the basic component and the additional part; and
at least one wall-like intermediate piece disposed in at least one of the basic component and the additional part and extending from the respective outer wall into the internal cavity, the at least one wall-like intermediate piece including a cutout having a transition contour that deviates from a straight line and is disposed at at least one transition between the at least one wall-like intermediate piece and the outer wall so as to relieve at least one of a mechanical and a thermal stress;
wherein the at least one wall-like intermediate piece includes a first intermediate piece disposed in the basic component and a second intermediate piece disposed in the additional part, and wherein the first intermediate piece and the second intermediate piece are aligned with each other and butt against each other at the joint region; and
wherein the first intermediate piece and the second intermediate piece butt against each other at the joint region by a butt joint having a cross-sectional contour that deviates from a straight line oriented perpendicularly to the intermediate pieces so as to reduce flow turbulences occurring at the butt joint.

17. The turbomachine component as recited in claim 16, wherein the cross-sectional contour is linear and disposed obliquely to the intermediate pieces.

18. The turbomachine component as recited in claim 16, wherein the cross-sectional contour is V-shaped.

19. The turbomachine component as recited in claim 16, wherein the cross-sectional contour is arc-shaped.

* * * * *